United States Patent
Hsu

(10) Patent No.: US 9,791,136 B2
(45) Date of Patent: Oct. 17, 2017

(54) COUNTERWEIGHT ARM MECHANISM

(71) Applicant: Chia-Yi Hsu, Taipei (TW)

(72) Inventor: Chia-Yi Hsu, Taipei (TW)

( * ) Notice: Subject to any disclaimer, the term of this patent is extended or adjusted under 35 U.S.C. 154(b) by 216 days.

(21) Appl. No.: 14/651,232

(22) PCT Filed: Oct. 10, 2013

(86) PCT No.: PCT/CN2013/084953
§ 371 (c)(1),
(2) Date: Jun. 11, 2015

(87) PCT Pub. No.: WO2014/090029
PCT Pub. Date: Jun. 19, 2014

(65) Prior Publication Data
US 2015/0316239 A1     Nov. 5, 2015

(30) Foreign Application Priority Data

Dec. 14, 2012 (CN) .......................... 2012 1 0543982

(51) Int. Cl.
| | |
|---|---|
| *F21S 8/08* | (2006.01) |
| *F21V 21/14* | (2006.01) |
| *F16M 11/10* | (2006.01) |
| *F16M 11/20* | (2006.01) |
| *F21S 6/00* | (2006.01) |

(52) U.S. Cl.
CPC ............. *F21V 21/14* (2013.01); *F16M 11/10* (2013.01); *F16M 11/2014* (2013.01); *F16M 11/2021* (2013.01); *F16M 2200/041* (2013.01); *F21S 6/003* (2013.01)

(58) Field of Classification Search
CPC ........... F21V 21/30; F21V 21/14; F21V 21/26
USPC .......................................................... 362/418
See application file for complete search history.

(56) References Cited

U.S. PATENT DOCUMENTS

2014/0268726 A1* 9/2014 Yu ........................... F21V 21/26
362/220

* cited by examiner

*Primary Examiner* — Jamara Franklin

(57) ABSTRACT

A counterweight arm mechanism having an adjustable dragline tension system capable of adjusting tension; the system comprising a dragline, an extension spring, and a dragline adjustment mechanism; the dragline adjustment mechanism adjusted the overall length of the dragline as a function of the rotation angle of a counterweight arm; the dragline length adjustment mechanism being implemented according to the two legs of a right-angled $\triangle ABC$ and the property of $a+b=2\sqrt{2}R\sin(A+\pi/4)$; when the counterweight arm rotates, the mechanical structure can be used to drive the vertex of the right angle of the right-angled $\triangle ABC$ to rotate along with the counterweight arm, and synchronously move in line with the circumcircle of the right-angled $\triangle ABC$, thus the tension on the counterweight arm from the adjustable dragline tension system changes with the rotation angle of the counterweight arm.

7 Claims, 7 Drawing Sheets

COUNTERWEIGHT ARM MECHANISM

BACKGROUND OF INVENTION

1. Field of the Invention

The present invention relates to a counterweight arm mechanism, particularly to a passive counterweight arm mechanism that uses an extension spring to provide tension, and more particularly to a counterweight arm mechanism that can adjust the stretched length of the extension spring to adjust the tension of the tension system. Said tension system refers to a dragline tension system comprising an extension spring and a dragline.

2. Description of Related Art

Counterweight arms are commonly seen mechanical devices with wide applications in, for example, counterweight arm suspenders, medical shadowless lamps, robot arms, counterweight arm lamps etc, wherein, counterweight arm lamps are very common equipment in living and working environments.

A counterweight arm lamp is a lamp with a foldable and extendable lamp arm for diversified lighting needs.

Generally, a counterweight arm lamp has a structure similar to human arm. Apart from the light source and lampshade, it has a front lamp arm, a joint, a support arm, and a base.

The light source and lampshade are configured on the front end of the front lamp arm, the rear end of the lamp arm is connected to the support arm through the joint, and the joint has a rotating shaft structure, so that the front lamp arm can be folded downward or lifted upward in a vertical plane; the other end of the support arm is connected to the base. Between the support arm and the base, usually there is also a rotating shaft structure, so that, in relation to the base, the support arm can be adjusted for an appropriate angle of inclination and can rotate horizontally.

Hereafter, if not otherwise specified, the front lamp arm and the support arm are collectively referred to as the lamp arm. When the lamp arm is tilted or stretched, it will be subject to a torque generated by the force of gravity, and will tend to droop. Therefore, it must rely on the tension of a tension system and the frictional force of the rotating shaft structure or a reverse balance torque to resist the force of gravity, so that the lamp arm can stay at the tilted or stretched position.

When the lamp arm of the counterweight arm lamp is stretched to the horizontal position, the torque on the lamp arm generated by the force of gravity reaches the maximum degree. At this point, the tension system of the lamp arm shall have sufficient tension to resist the torque generated by the force of gravity, so that the stretched lamp arm can stay still and will not droop.

However, the tension of the tension system on the lamp arm of a conventional counterweight arm lamp is directly proportional to the stretched length of the extension spring. When the lamp arm of the counterweight arm lamp is folded downward from the horizontal position, the extension spring will be stretched to a great length, causing a high spring stress. Therefore, the lamp arm of the counterweight arm lamp can not be folded for a large angle, or, due to a large downward folding angle, the extension spring is stretched to its limit, causing fatigue of the extension spring. Similar problems are found in patent literatures like: U.S. Pat. No. 2,076,446, U.S. Pat. No. 2,787,434, U.S. Pat. No. 5,016,153 etc.

To further understand the performance of the conventional counterweight arm in prior-art counterweight arm lamps, below are detailed descriptions with reference to the accompanied drawings.

Firstly, FIG. 1 is a working drawing of the extension spring of a prior-art counterweight arm lamp, which discloses a common counterweight arm mechanism of a counterweight arm lamp. A conventional counterweight arm 1 is a third-class lever with pivot point on the horizontal rotating shaft X of the counterweight arm perpendicular to its movement plane, the load W is located on the conventional counterweight arm 1, on a remote position beyond the rotating shaft X of the counterweight arm, and the point of application D is located between the pivot point and the load.

Due to the tension of the conventional tension system 3 of the conventional counterweight arm 1 and the frictional force of the rotating shaft X of the counterweight arm, the conventional counterweight arm 1 can stay at a stretched position and will not droop.

In FIG. 1, the conventional counterweight arm 1 stays at the horizontal position. When the conventional counterweight arm 1 is folded downward, i.e., to the position marked by the dotted line in FIG. 1, the extension spring S of the conventional tension system 3 is stretched, with the stretched length being $\Delta L$.

In this patent description, said conventional tension system 3 refers to an extension spring S or the combination of an extension spring S and a dragline T. Said extension spring S is often hidden inside a tube-shaped lamp arm structure. Said conventional tension system 3 is very commonly seen in counterweight arm lamps sold in the market.

FIG. 2 is another working drawing of the extension spring of a prior-art counterweight arm lamp. The conventional counterweight arm 1 in this drawing is a first-class ever with pivot point on the horizontal rotating shaft X of the counterweight arm. Having the horizontal rotating shaft X of the counterweight arm as the pivot point, the Joint of application D of the extension spring on the conventional counterweight arm 1 and the load W are respectively located on either side of the pivot point. When the conventional counterweight arm 1 is folded downward, i.e., to the position marked by the dotted line in FIG. 2, the conventional tension system 3 is stretched, and in fact, only the extension spring S can be stretched, with the stretched length being $\Delta L$.

In FIG. 1 and FIG. 2, when the conventional counterweight arm 1 is folded further downward, the extension spring S will be further stretched, but such a stretching is unhelpful. In other words, it is an unhelpful stretching because when the conventional counterweight arm 1 is folded downward and move away from the horizontal position, the torque generated by the force of gravity on the conventional counterweight arm 1 is decrementing, while the extension spring S is stretched, with the consequent increased tension being unhelpful. On the contrary, the conventional counterweight arm 1 has a tendency to be pulled back upward, and as a result, the range of folding the conventional counterweight arm 1 downward is limited; Moreover, the excessive unhelpful stretching of the extension spring S may easily cause fatigue of the extension spring.

As shown in FIG. 1, rotating shaft X of the counterweight arm is a horizontal rotating shaft perpendicular to the movement plane of the conventional counterweight arm 1. one end of the conventional tension system 3 is fixed on a fixed point G via a shaft parallel to the rotating shaft X of the counterweight arm, and the other end of the conventional tension system 3 is fixed on the point of application D on the conventional counterweight arm 1 via a shaft parallel to the rotating shaft X of the counterweight arm. The distance from the axis of the rotating shaft X of the counterweight arm to the fixed point G of the conventional tension system on the torque support 2 is R, and the distance to the point of application D on the counterweight arm is KR, where K is proportionality constant. When the conventional counterweight arm 1 is at the horizontal position, The total length of the conventional tension system 3 including the extension spring S and the dragline T is $(\sqrt{(1+K^{*}2)})R$. In the following sections of this patent description, R will be defined as the radium of the circumscribed circle of a triangle, but here, the distance from the axis of the rotating shaft X of the counterweight arm to the fixed point G of the conventional tension system on the torque support 2 is set as R for the convenience of reference in the following sections.

As indicated by the dotted line in FIG. 1, when the conventional counterweight arm 1 is folded downward from the horizontal position, the conventional tension system 3 is stretched for ΔL, i.e., the extension spring S in the conventional tension system is stretched for ΔL, because the length of dragline T is not changed. It is to be noted here, that, the positions of the extension spring S and dragline T in the conventional tension system 3 shown in FIG. 1 can be exchanged, and after exchange, the tensions on the two ends of the conventional tension system are the same.

When the conventional counterweight arm 1 is folded downward to a position close to its limit, i.e., the conventional counterweight arm 1 is almost vertically downward, the length of the conventional tension system 3 will be close to (R+KR), (R+KR) being the maximum length to which the conventional tension system 3 can be stretched. Hence, the maximum length increased due to unhelpful stretching of the extension spring S is:

$$\Delta L(\text{maximum value}) = (R+KR) - (\sqrt{(1+K^{*}2)})R; \quad \text{Formula 1}$$

The technical solution of the present invention is to eliminate or reduce the increased length ΔL due to unhelpful stretching of the extension spring S of a conventional tension system 3. In other words, the object of the present invention is to eliminate or improve the deficiency caused by unhelpful stretching of the extension spring S.

SUMMARY OF THE INVENTION

The present invention discloses a technical solution to overcome the deficiency of conventional passive counterweight arm devices, such as problems that, when the lamp arm of a conventional counterweight arm lamp is folded downward from the horizontal position, the extension spring is stretched to a great length, generating a high spring tension, causing a result that the lamp arm of the counterweight arm lamp can not be folded downward for a large angle, or that when the downward folding angle is too large, the extension spring is stretched to its limit, easily causing fatigue of the extension spring.

To solve the above mentioned problem and achieve the purpose of the present invention, the technical scheme:

a counterweight arm mechanism, comprising:

a counterweight arm, a counterweight arm rotating shaft, a the counterweight arm mechanism main frame, a base, and an adjustable dragline tension system;

said counterweight arm rotating shaft is a horizontal rotating shaft, perpendicular to the rotation plane of the counterweight arm, configured on the counterweight arm mechanism main frame;

said counterweight arm is constituted by combining the counterweight arm rotating shaft and the counterweight arm mechanism main frame, said counterweight arm rotating shaft also has a facility to adjust the frictional force, and said the counterweight arm mechanism main frame is fixed on the base;

said adjustable dragline tension system comprises a dragline, an extension spring, and a dragline adjusting mechanism;

a drive mechanism is configured between the adjustable dragline tension system and the counterweight arm;

said dragline adjusting mechanism comprises a dragline torque support, a dragline torque support pulley, a dragline adjusting mechanism fixed arm, a dragline adjusting mechanism fixed arm pulley, a dragline adjusting mechanism movable arm, a dragline adjusting mechanism movable arm pulley, and a dragline adjusting mechanism movable arm shaft;

said dragline adjusting mechanism movable arm shaft is a horizontal rotating shaft parallel to the counterweight arm rotating shaft, and said dragline adjusting mechanism movable arm is fixed on the dragline adjusting mechanism movable arm shaft;

said dragline torque support, dragline adjusting mechanism fixed arm, and dragline adjusting mechanism movable arm have equal length, and are radially configured with the dragline adjusting mechanism movable arm shaft as the axis, and their terminal positions are respectively provided with a dragline torque support pulley, a dragline adjusting mechanism fixed arm pulley, and a dragline adjusting mechanism movable arm pulley, wherein, the dragline torque support and the dragline adjusting mechanism fixed arm are fixed on the structure of the counterweight arm mechanism main frame, forming a symmetric linear structure with the dragline adjusting mechanism movable arm shaft as the center;

said dragline adjusting mechanism, located at the central position of the adjustable dragline tension system, with its two ends being the extension spring and the dragline; in the dragline adjusting mechanism, the dragline goes in turn around the dragline adjusting mechanism fixed arm pulley, the dragline adjusting mechanism movable arm pulley, and the dragline torque support pulley;

one end of the adjustable dragline tension system is connected to the rotary counterweight arm, the other end of the adjustable dragline tension system is fixed on the structure of the counterweight arm mechanism main frame, and the extension spring of the adjustable dragline tension system is configured on either end of the adjustable dragline tension system;

the total length of the dragline and extension spring of the adjustable dragline tension system is adjustable; the dragline adjusting mechanism is the adjusting mechanism for the total length of the dragline and extension spring of the adjustable dragline tension system; the tension of the adjustable dragline tension system varies with the adjustment of the total length of the dragline and extension spring by the dragline adjusting mechanism;

said dragline adjusting mechanism is a right angle triangle mechanism, and the catheti of the right angle triangle mechanism are made up of part of the dragline, respectively being the dragline between the dragline adjusting mechanism fixed arm pulley and the dragline adjusting mechanism movable arm pulley and the dragline between the dragline torque support pulley and the dragline adjusting mechanism movable arm pulley; said dragline adjusting mechanism movable arm shaft is the center of the circumscribed circle of the right angle triangle mechanism of the dragline adjusting mechanism; the hypotenuse of the right angle triangle mechanism of the dragline adjusting mechanism is the diameter of the circumscribed circle; the hypotenuse is made up of the dragline torque support and the dragline adjusting mechanism fixed arm; the dragline torque support and the dragline adjusting mechanism fixed arm are in a symmetric linear arrangement with the center of the circumscribed circle of the right angle triangle mechanism as the symmetric center;

said dragline adjusting mechanism movable arm is fixed on the dragline adjusting mechanism movable arm shaft; the relative positions of the dragline adjusting mechanism movable arm and the counterweight arm are: when the counterweight arm stays at the horizontal position, the dragline adjusting mechanism movable arm is perpendicular to the hypotenuse of the right angle triangle mechanism of the dragline adjusting mechanism, i.e., when the counterweight arm stays at the horizontal position, the dragline adjusting mechanism movable arm is perpendicular to the linear structure integrating the dragline torque support and the dragline adjusting mechanism fixed arm, so that the right angle triangle mechanism of the dragline adjusting mechanism forms an isosceles right angle triangle;

said dragline adjusting mechanism movable arm pulley is located at the right angle vertex of the right angle triangle mechanism; the dragline adjusting mechanism movable arm can rotate with the counterweight arm for an equal angle; when the dragline adjusting mechanism movable arm rotates, the dragline adjusting mechanism movable arm pulley moves on part of the circular arc of the circumscribed circle of the right angle triangle mechanism.

Wherein the drive mechanism configured between the counterweight arm and the adjustable dragline tension system is the dragline adjusting mechanism movable arm shaft and the counterweight arm rotating shaft sharing the same shaft and fixed to each other; the dragline adjusting mechanism movable arm is fixed on the dragline adjusting mechanism movable arm shaft; when the counterweight arm rotates, the dragline adjusting mechanism movable arm fixed on the dragline adjusting mechanism movable arm shaft will rotate simultaneously with the counterweight arm.

The driving mechanism configured between the counterweight arm and the adjustable dragline tension system is a gear set mechanism; said gear set mechanism at least comprises a first gear sharing the same axis as the counterweight arm rotating shaft, a second gear that meshes with the first gear, and a third gear that meshes with the second gear;

the first gear and the counterweight arm rotating shaft share the same shaft and are fixed to each other; the first gear can rotate simultaneously with the counterweight arm; when the first gear rotates along with the counterweight arm, it drives the second gear; the second gear is an intermediate gear, and can drive the third gear; the third gear and the first gear are gears of equal-addendum teeth;

the shaft of the third gear is the dragline adjusting mechanism movable arm shaft; the dragline adjusting mechanism movable arm is fixed on the shaft of the third gear;

when the counterweight arm rotates, the third gear rotates with the counterweight arm for an equal angle, and the dragline adjusting mechanism movable arm also rotates with the counterweight arm for an equal angle;

when the counterweight arm stays at the horizontal position, the dragline adjusting mechanism movable arm installed on the shaft of the third gear is directed to the counterweight arm rotating shaft, and with the shaft of the third gear as symmetric center, at a position on the straight line perpendicular to the dragline adjusting mechanism movable arm, the dragline torque support and dragline adjusting mechanism fixed arm are symmetrically configured;

the dragline torque support terminal position is installed with a dragline torque support pulley, and the dragline adjusting mechanism fixed arm terminal position is installed with a dragline adjusting mechanism fixed arm pulley;

the distances from the shaft of the third gear to the dragline torque support terminal position and to the dragline adjusting mechanism fixed arm terminal position are equal to the length of the dragline adjusting mechanism movable arm, and are all equal to the radium of the circumscribed circle of the right angle triangle mechanism of the dragline adjusting mechanism; the dragline adjusting mechanism movable arm terminal position is installed with a dragline adjusting mechanism movable arm pulley;

when the counterweight arm rotates, the third gear rotates with the counterweight arm for an equal angle, and the dragline adjusting mechanism movable arm also rotates with the counterweight arm for an equal angle.

Wherein the dragline adjusting mechanism is a right angle triangle mechanism; the catheti of the right angle triangle mechanism are made up of parts of the dragline of the adjustable dragline tension system; the dragline length adjusting mechanism is implemented according to the feature of the sum of catheti of the right angle triangle $\triangle ABC$, i.e., $a+b=2\sqrt{2}\,R\cdot\sin(A+\pi/4)$; in the above formula of sine function, a and b are the sides opposite $\angle A$ and $\angle B$ of the right angle triangle $\triangle ABC$, $\angle C$ is a right angle, R is the radium of the circumscribed circle of the right angle triangle $\triangle ABC$, and a and b are catheti of the right angle triangle $\triangle ABC$; according to the formula of sine function feature of the sum of catheti of a right angle triangle, when the counterweight arm stays at the horizontal, position, sum of catheti is set as the maximum value, i.e., $\angle A$ is equal to $\pi/4$, the right angle triangle mechanism is an isosceles right angle triangle; when the counterweight arm rotates to depart from the horizontal position, the right angle vertex C of the right angle triangle $\triangle ABC$ rotates with the counterweight arm on the arc of the circumscribed circle of the right angle triangle $\triangle ABC$, and the length of the sum of catheti varies according to the above formula of sine function feature of the sum of catheti of the right angle triangle.

Wherein one end of the counterweight arm beyond the counterweight arm rotating shaft is provided with a load; said load is a lighting device.

Wherein one end of the counterweight arm beyond the counterweight arm rotating shaft is provided with a load; said load is a lighting device;

between the counterweight arm mechanism and the base, there is a further configuration of a parallel-plane four-bar device;

the base bar of the parallel-plane four-bar device is fixed on the base, and the plane of the parallel-plane four-bar device is the same as the movement plane of the counterweight arm; the counterweight arm mechanism main frame of the counterweight arm mechanism is fixed on the connecting bar of the parallel-plane four-bar device; the connecting bar is parallel to the base bar; when the counterweight arm stays at the horizontal position, the dragline adjusting mechanism movable arm of the counterweight arm mechanism is perpendicular to the hypotenuse of the right angle triangle mechanism of the dragline adjusting mechanism, and the right angle triangle mechanism of the dragline adjusting mechanism forms an isosceles right angle triangle.

Wherein one end of the adjustable dragline tension system is connected to the rotary counterweight arm, and the other end of the adjustable dragline tension system is connected to the stationary the counterweight arm mechanism main frame; the extension spring of the adjustable dragline tension system is configured on the counterweight arm.

The critical part of technical scheme of the present invention is an adjustable dragline tension system that can adjust the tension. Said adjustable dragline tension system comprises a dragline, an extension spring, and a dragline adjusting mechanism; said dragline adjusting mechanism can adjust the total dragline length according to the rotation angle of the counterweight arm; said total dragline length includes the length of the extension spring plus the length of the dragline.

Said dragline length adjusting mechanism is basically implemented according to the feature of the sum of catheti of a right angle triangle $\triangle ABC$, i.e., $(a+b)=2\sqrt{2}\,R\cdot\sin(A+\pi/4)$.

In the above formula, a and b are respective y sides opposite to $\angle A$, $\angle B$ of $\triangle ABC$, $\angle C$ is a right angle, R is the radium of the circumscribed circle of the right angle triangle $\triangle ABC$, and a and b are two catheti of the right angle triangle $\triangle ABC$.

Based on the above feature of the sum of catheti of a right angle triangle, when catheti a and b are constituted by parts of the dragline of the dragline tension system of a counterweight arm, and when the right angle vertex of the right angle triangle $\triangle ABC$ can, through a mechanical structure, simultaneously move along the semi-circular arc of the circumscribed circle of the right angle triangle $\triangle ABC$ along with the rotation angle of the counterweight arm, the tension received by the counterweight arm will vary with the rotation angle of the counterweight arm. The length variation of the sum of catheti with the rotation angle of the counterweight arm according to the above formula will be detailed with reference to FIG. 3.

So, the present invention can eliminate or reduce the increased length $\Delta L$ caused by unhelpful stretching of the extension spring in a conventional tension system, and meanwhile eliminate or improve the deficiency of spring fatigue caused by unhelpful stretching of the extension spring S.

DETAILED DESCRIPTION OF THE INVENTION

With reference to the accompanied drawings, detailed descriptions of the present invention are provided below including structural features, technical solutions, working principles and application examples.

Figure 3:
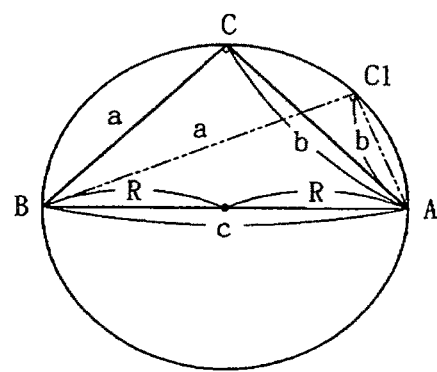
FIG. 3: an illustration of the principle of the present invention based on the law of sines.

FIG. 3 is an illustration of the principle of the present invention, wherein, a, b, and c are respectively sides opposite $\angle A$, $\angle B$, $\angle C$ of $\triangle ABC$. According to the law of sines, $a/\sin A = b/\sin B = c/\sin C = 2R$, where, R is radium of the circumscribed circle of $\triangle ABC$.

When $\angle C$ is a right angle, $\triangle ABC$ is a right angle triangle, the side opposite $\angle C$ is hypotenuse c, the length of hypotenuse c is 2R, and a and b are catheti.

When vertex C of $\angle C$ moves along the arc of the circumscribed circle with radium being R, for example, to the position marked by C1, $\triangle ABC$ will remain as a right angle triangle.

According to the law of sines, sum of catheti of a right angle triangle $\triangle ABC$ $a+b=2R(\sin A+\sin B)=2R(\sin A+\cos A)$.

Moreover, according to the feature that any linear combination of sine waves of the same cycle but different phase shifts is a sine wave of the same cycle but different phase shifts, in the case of a linear combination of sine and cosine waves, we have:

$$m\sin x + n\cos x = \sqrt{(m^{*2}+n^{*2})}\cdot\sin(x+\phi);$$

wherein, m, n are arbitrary constants, $\phi=\arctan(n/m)$;
if: m=1, n=1, then $\sin x+\cos x=\sqrt{2}\cdot\sin(x+\pi/4)$
We get Formula 2:

The sum of catheti of a right angle triangle $\triangle ABC$
$$a+b=2\sqrt{2}\,R\cdot\sin(A+\pi/4);$$

Formula 2 shows that, sum of catheti of a right angle triangle $\triangle ABC$ (a+b) is a sine function, with phase difference of $\pi/4$. When $\angle A=\pi/4$, $\triangle ABC$ is an isosceles right angle triangle, sum of catheti a+b reaches maximum value, i.e., $a+b=2\sqrt{2}R$(maximum value);

According to Formula 2 and FIG. 3, when the right angle vertex C of a right angle triangle $\triangle ABC$ moves away from the position when $\triangle ABC$ is an isosceles right angle triangle, and along the semi-circular arc, sum of catheti a+b decreases gradually. When $\angle A\to 0$, $a\to 0$, $a+b\to 2R$ (minimum value), and when $\angle A\to\pi/2$, $b\to 0$, $a+b\to 2R$ (minimum value). The difference between the maximum value and minimum value of sum of catheti is $2\sqrt{2}R-2R$, $0<\angle A<\pi/2$.

It is shown that, when the right angle vertex C of a right angle triangle $\triangle ABC$ moves away from the position when $\triangle ABC$ is an isosceles right angle triangle, and along the semi-circular arc of the circumscribed circle, the maximum length change of sum of catheti a+b is: $\Delta(a+b)$(maximum value)$=2\sqrt{2}R-2R$;

Based on the above feature of the sum of catheti of a right angle triangle, if, catheti a, b are parts of the dragline of the dragline tension system of the counterweight arm, and when the counterweight arm rotates, the right angle vertex C of the right angle triangle ΔABC will go along with the mechanical structure and simultaneously move along a semi-circular arc on the circumscribed circle of the right angle triangle ΔABC. Therefore, when the counterweight arm rotates, this part of dragline of the dragline tension system will simultaneously change according to the above function of the sum of catheti of a right angle triangle ΔABC, i.e., a+b=2√2 R·sin (A+π/4), wherein, 0<∠A<π/2.

Because the whole dragline tension system is made up of the dragline and the extension spring, and the length of the dragline itself will not change, the change of length of sum of catheti is from the change of length of the extension spring.

When the length of sum of catheti is long, it means the length of extension spring is increased, and when the length of sum of catheti is short, it means the stretched length of the extension spring is reduced.

When the counterweight arm is at the horizontal position, it is subject to the maximum force of gravity torque. Hence, when the counterweight arm is at the horizontal position, the extension spring shall be under the maximum tension state to provide the maximum tension, i.e., the total dragline length of the dragline tension system shall be at the maximum value, with length of sum of catheti be at the maximum value.

According to Formula 2, sum of catheti of a right angle triangle ΔABC $$a+b=2\sqrt{2}R\cdot\sin(A+\pi/4),$$

Maximum value of sum of catheti is reached when ∠A=π/4, i.e., when ΔABC is an isosceles right angle triangle.

Hence, when the counterweight arm is at the horizontal position, the right angle triangle ΔABC shall be an isosceles right angle triangle, so that the extension spring is under the maximum tension state to provide the maximum tension.

Figure 4:
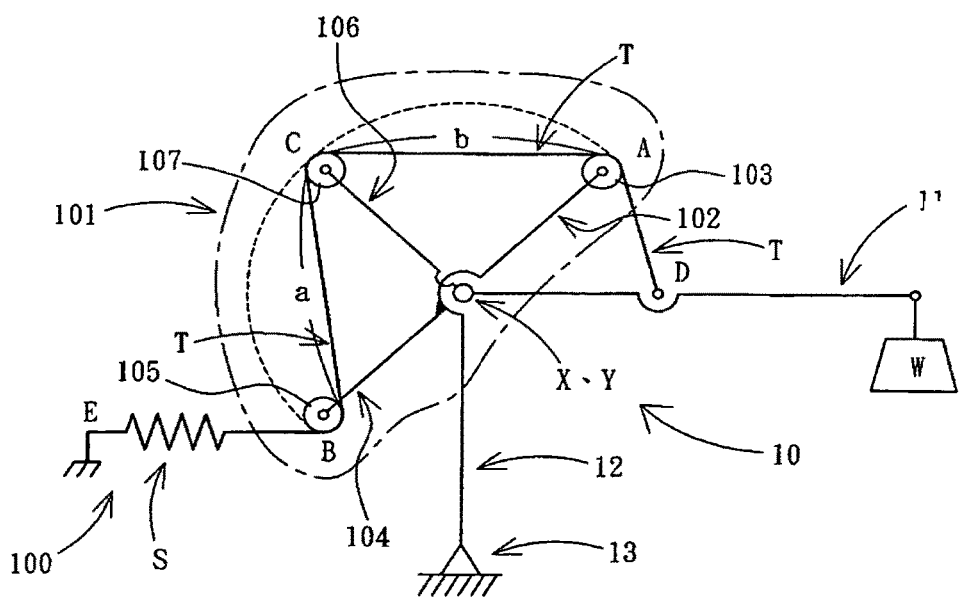
FIG. 4: an illustration of the counterweight arm mechanism of the present invention.

FIG. 4 shows an illustration of the counterweight arm mechanism of the present invention. Based on the above law of sines, the counterweight arm mechanism 10 is designed with inclusion of a counterweight arm 11, a rotating shaft X of the counterweight arm, a the counterweight arm mechanism main frame 12, a base 13, and an adjustable dragline tension system 100;

The rotating shaft X of said counterweight arm is a horizontal rotating shaft, perpendicular to the rotation plane of the counterweight arm 11, configured on the counterweight arm mechanism main frame 12;

Said counterweight arm 11 is combined with the counterweight arm mechanism main frame 12 via the rotating shaft X of the counterweight arm, the rotating shaft X of the counterweight arm is also provided with a facility to adjust the frictional force (not shown in FIG. 4), and the counterweight arm mechanism main frame 12 is fixed on the base 13.

Said adjustable dragline tension system 100 comprises a dragline T, an extension spring S, and a dragline adjusting mechanism 101;

Said dragline adjusting mechanism 101 comprises a dragline torque support 102, a dragline torque support pulley 103, a dragline adjusting mechanism fixed arm 104, a dragline adjusting mechanism fixed arm pulley 105, a dragline adjusting mechanism movable arm 106, a dragline adjusting mechanism movable arm pulley 107, and a rotating shaft Y of the dragline adjusting mechanism movable arm;

Said rotating shaft Y of the dragline adjusting mechanism movable arm is a horizontal rotating shaft parallel to rotating shaft X of said counterweight arm. Said dragline adjusting mechanism movable arm 106 is fixed on the rotating shaft Y of the dragline adjusting mechanism movable arm;

Load W is located on the counterweight arm 11 at a remote position beyond the rotating shaft X of the counterweight arm.

Said dragline torque support 102, dragline adjusting mechanism fixed arm 104, dragline adjusting mechanism movable arm 106 share the same length, and are radially arranged with rotating shaft Y of the dragline adjusting mechanism movable arm being the axis; the terminal position A of the dragline torque support is provided with a dragline torque support pulley 103; the terminal position B of the dragline adjusting mechanism fixed arm is provided with a dragline adjusting mechanism fixed arm pulley 105; the terminal position of the dragline adjusting mechanism movable arm is provided with a dragline adjusting mechanism movable arm pulley 107, wherein, the dragline torque support 102 and the dragline adjusting mechanism fixed arm 104 are fixed on the structure of the counterweight arm mechanism main frame 12, forming a symmetric linear structure with the rotating shaft Y of the dragline adjusting mechanism movable arm being the center;

Said dragline adjusting mechanism 101 is located at the central position of the adjustable dragline tension system 100, with its two ends being the extension spring S and the dragline T. In the dragline adjusting mechanism 101, the dragline T goes in turn around the dragline adjusting mechanism fixed arm pulley 105, the dragline adjusting mechanism movable arm pulley 107, and the dragline torque support pulley 103;

Because the tension of the adjustable dragline tension system 100 is not related to the position of the extension spring S, no matter if the extension spring S is configured on either end of the adjustable dragline tension system 100, the tension will be the same;

One end of the adjustable dragline tension system 100 is connected to the rotary counterweight arm 11, and the other end of the adjustable dragline tension system 100 is fixed on the structure of the counterweight arm mechanism main frame 12;

The extension spring S of the adjustable dragline tension system 100 can be configured on either end of the adjustable dragline tension system 100.

Total length of the dragline T and the extension spring S of said adjustable dragline tension system 100 is adjustable. The dragline adjusting mechanism 101 is the adjusting mechanism for the total length of the dragline T and the extension spring S. The tension of said adjustable dragline tension system 100 varies with the adjustment of the total length of the dragline T and the extension spring S by the dragline adjusting mechanism 101. Said dragline adjusting mechanism 101 is a right angle triangle mechanism, with catheti a and b of the right angle triangle mechanism formed by two parts of the dragline T, respectively part of dragline T between the dragline adjusting mechanism fixed arm pulley 105 and the dragline adjusting mechanism movable arm pulley 107, and part of dragline T between the dragline torque support pulley 103 and the dragline adjusting mechanism movable arm pulley 107; Said rotating shaft Y of the dragline adjusting mechanism movable arm is the center of the circumscribed circle of the right angle triangle mechanism of said dragline adjusting mechanism 101, and the hypotenuse c of the right angle triangle mechanism of the dragline adjusting mechanism 101 is the diameter of the circumscribed circle. The hypotenuse c is made up of the dragline torque support 102 and the dragline adjusting mechanism fixed arm 104. The dragline torque support 102 and the dragline adjusting mechanism fixed arm 104 are in a symmetric linear arrangement with the center of the circumscribed circle of the right angle triangle mechanism as the symmetric center;

Said dragline torque support pulley 103 is configured at the dragline torque support terminal position A of the dragline torque support 102, and the dragline adjusting mechanism fixed arm pulley 105 is configured at the dragline adjusting mechanism fixed arm terminal position B of the dragline adjusting mechanism fixed arm 104; Moreover, said dragline adjusting mechanism movable arm pulley 107 is configured on the dragline adjusting mechanism movable arm 106. The distances from the rotating shaft Y of the dragline adjusting mechanism movable arm to the dragline torque support pulley 103, to the dragline adjusting mechanism fixed arm pulley 105, and to the dragline adjusting mechanism movable arm pulley 107 are the same. The position of the dragline adjusting mechanism movable arm pulley 107 is equivalent to the right angle vertex C of the right angle triangle mechanism; Said dragline adjusting mechanism movable arm 106 is fixed on the rotating shaft Y of the dragline adjusting mechanism movable arm. The relative positions of the dragline adjusting mechanism movable arm 106 and the counterweight arm 11 are: when the counterweight arm 11 stays at the horizontal position, the dragline adjusting mechanism movable arm 106 is perpendicular to the hypotenuse of the right angle triangle mechanism of the dragline adjusting mechanism 101, i.e., when the counterweight arm 11 stays at the horizontal position, the dragline adjusting mechanism movable arm 106 is perpendicular to the linear structure integrating the dragline torque support 102 and the dragline adjusting mechanism fixed arm 104, so that the right angle triangle mechanism of the dragline adjusting mechanism 101 forms an isosceles right angle triangle;

Said dragline adjusting mechanism movable arm pulley 107 is located at the right angle vertex C of the right angle triangle mechanism. The dragline adjusting mechanism movable arm 106 can rotate with the counterweight arm 11 for an equal angle. When the dragline adjusting mechanism movable arm 106 rotates, the dragline adjusting mechanism movable arm pulley 107 moves on part of the circular arc of the circumscribed circle of the right angle triangle mechanism.

One end of the above dragline T goes around the dragline torque support pulley 103, and is connected to the point of application D on the counterweight arm 11;

The other end of the above dragline T goes around the dragline adjusting mechanism fixed arm pulley 105, and is connected to one end of the extension spring S, while the other end of the extension spring S is fixed on structure position E of the counterweight arm mechanism main frame 12.

Figure 5:
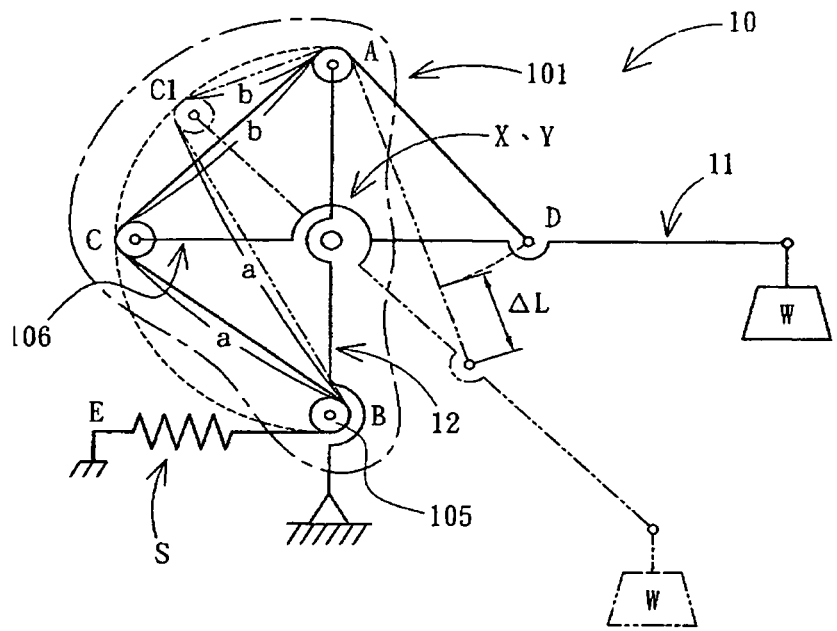
FIG. 5: an illustration of an embodiment of the counterweight arm mechanism of the present invention.
Figure 6:
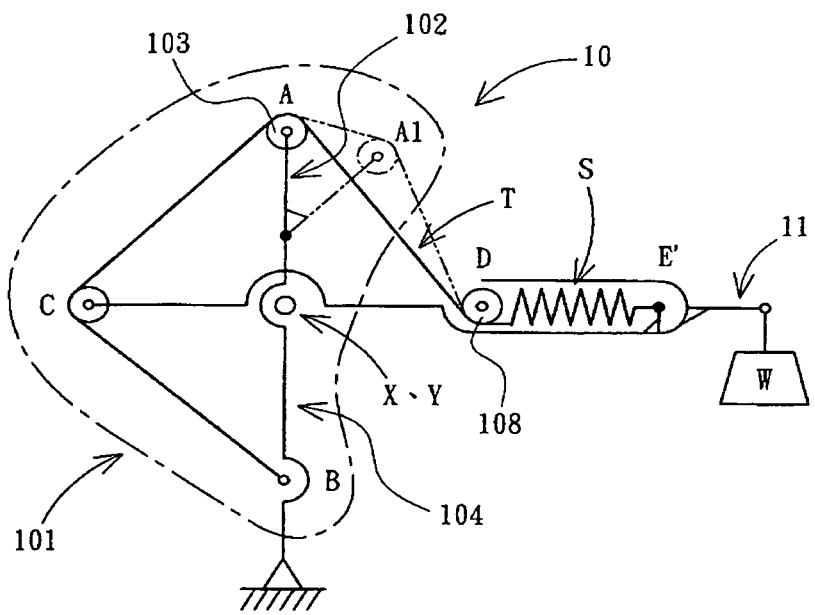
FIG. 6: an illustration of another implementation of the embodiment in FIG. 5.

Because the tension is the same no matter if the extension spring S is configured on either end of the adjustable dragline tension system 100, the tension of the adjustable dragline tension system 100 is not related to the position of the extension spring S on the adjustable dragline tension system 100;

For example, as shown in FIG. 5, the extension spring S can be configured at structure position F on the counterweight arm mechanism main frame 12; or, as shown in FIG. 6, configured at position E' on the rotary counterweight arm 11.

Said dragline torque support pulley 103, dragline adjusting mechanism fixed arm pulley 105, and dragline adjusting mechanism movable arm pulley 107 are all pulleys with small diameters, with all of their rotating shafts parallel to the rotating shaft X of the counterweight arm.

The dragline adjusting mechanism movable arm rotating shaft Y of said dragline adjusting mechanism movable arm 106 and the rotating shaft X of the counterweight arm share the same axis and are fixed to each other; when rotating the counterweight arm 11, the dragline adjusting mechanism movable arm 106 rotates simultaneously with the counterweight arm 11.

The relative positions of the dragline adjusting mechanism movable arm 106 and the counterweight arm 11 are: when the counterweight arm 11 is at the horizontal position, the dragline adjusting mechanism movable arm 106 is perpendicular to the hypotenuse of the right angle triangle mechanism of the dragline adjusting mechanism 101. The hypotenuse of the right angle triangle mechanism is made up of the dragline torque support 102 and the dragline adjusting mechanism fixed arm 104. When the counterweight arm 11 is at the horizontal position, the right angle triangle mechanism of the dragline adjusting mechanism 101 forms an isosceles right angle triangle.

FIG. 5 is an illustration of an embodiment of the counterweight arm mechanism of the present invention. FIG. 5 shows a combination of FIG. 1 and FIG. 3, and also shows the condition when the dragline adjusting mechanism fixed arm 104 and the counterweight arm mechanism main frame 12 in FIG. 4 are overlapped and merged. The dragline adjusting mechanism fixed arm pulley 105 is installed on the counterweight arm mechanism main frame 12, with its shaft parallel to the rotating shaft X of the counterweight arm.

In FIG. 5, if we simply observe the external change of the dragline adjusting mechanism 101, when the counterweight arm 11 is folded from the horizontal position downward to the dotted line position, it seems that the adjustable dragline tension system is stretched for a length of ΔL; however, as the dragline adjusting mechanism 101 has meanwhile released some of the dragline, in fact there is no stretching for the length of ΔL.

According to Formula 1 and Formula 2, compare:

$$\Delta L(\text{maximum value}) = (R+KR) - (\sqrt{(1+K^{*2})})R; \quad \text{Formula 1}$$

sum of catheti of a right angle triangle $\Delta ABC$
$$a+b = 2\sqrt{2}\,R \cdot \sin(A+\pi/4); \quad \text{Formula 2}$$

Figure 1:
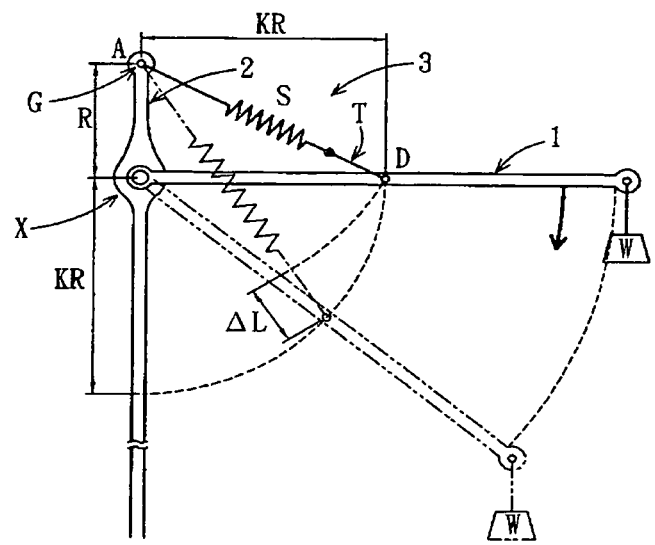
FIG. 1: a working drawing of the extension spring of a conventional counterweight arm lamp.
Figure 2:
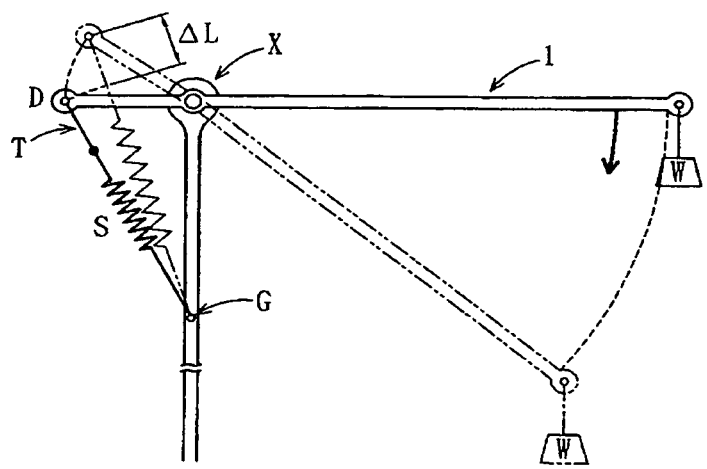
FIG. 2: a working drawing of the extension spring of another conventional counterweight arm lamp.

If the extension spring S in FIG. 1 is unhelpfully stretched and the increased length ΔL (maximum value) can be completely offset by the reduced length of the sum of catheti of the right angle triangle ΔABC, set:

$$((1+K) - \sqrt{(1+K^{*2})})R = 2\sqrt{2}R - 2R;$$

We get K=2.25, where K is a proportionality constant.

The above result shows that, if the distance from the point of application D on the counterweight arm in the dragline tension system in FIG. 5 to the axis of the rotating shaft X of the counterweight arm is 2.25 times the radium of circumscribed circle R of the right angle triangle ΔABC, when the counterweight arm 11 in FIG. 5 is folded from the horizontal position downward to be close to the vertical downward position, the increased length ΔL (maximum value) due to unhelpful stretching of dragline tension system can be completely offset.

Furthermore, according to Formula 1, when K=1, ΔL= $(2-\sqrt{2})R=0.6$ R, comparing to the difference between maximum value and minimum value of the sum of catheti a+b $2\sqrt{2}R-2R=0.8$ R, it is known that the dragline length released by the dragline adjusting mechanism 101 is 0.8 R, larger than the increased length 0.6 R due to unhelpful stretching of the extension spring S.

It shows that, when K=1, not just the increased length due to unhelpful stretching of the extension spring S can be completely offset, but there is still more allowance to further reduce the stretched length of the extension spring S, and reduce the tension of the dragline.

This can meet actual needs, because the counterweight arm 1 is folded from the horizontal position downward, the torque caused by force of gravity is diminishing.

Because the tension of the adjustable dragline tension system 100 is not related to the position of the extension spring S, the extension spring S can be configured on either end of the dragline T, and the tension will be the same.

FIG. 6 is another implementation of the embodiment in FIG. 5. In FIG. 6, the extension spring S of the adjustable dragline tension system 100 is installed on the counterweight arm. One end of the extension spring S is fixed at position E' on the counterweight arm 11, and the other end of the extension spring S is connected to the dragline T. The dragline T goes around the dragline deflection pulley 108 provided at the point of application D on the counterweight arm, and then connected to the dragline adjusting mechanism 101. The rotating shaft of the dragline deflection pulley 108 is perpendicular to the rotation plane of the counterweight arm 11.

Although the position of the extension spring S in FIG. 6 is different from that in FIG. 5, the effect on the adjustable dragline tension system 100 is the same. Actual position of the extension spring S shall be decided in consideration of actual needs. It can be installed on either end of the adjustable dragline tension system 100, i.e., the extension spring S can be configured on the end of the counterweight arm 11 shown in FIG. 6, and installed on the counterweight arm 11, or, it can be configured on the mechanical structure fixed with the counterweight arm mechanism main frame 12 in FIG. 5.

FIG. 6 discloses a pulley A1 marked by a dotted line. This is to show an additional aided torque support and a pulley A1, which will not affect the function of the dragline adjusting mechanism 101.

Hence, one end of the adjustable dragline tension system 100 is connected to the rotary counterweight arm 11; the other end of the adjustable dragline tension system 100 is connected to the mechanical structure fixed with the counterweight arm mechanism main frame 12; the extension spring S of the adjustable dragline tension system 100 can be configured on either end of the adjustable dragline tension system 100.

Figure 7:
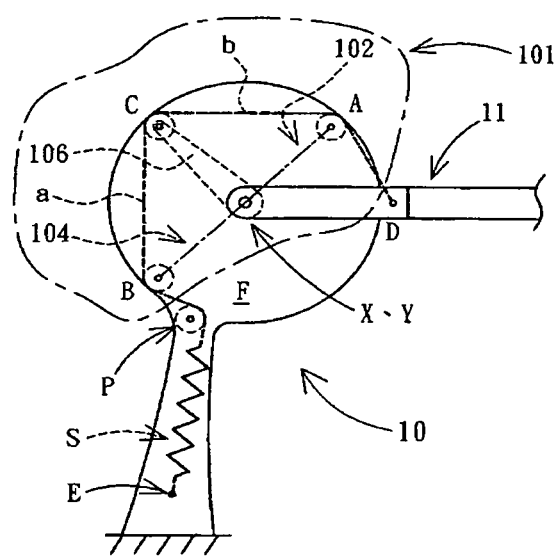
FIG. 7: an illustration of an example of application of the counterweight arm mechanism of the present invention.

FIG. 7 is an illustration of an example of application of the counterweight arm mechanism of the present invention. It is a direct application of the counterweight arm mechanism in FIG. 4, only replacing the independent dragline torque support 102 and dragline adjusting mechanism fixed arm 104 in FIG. 4 with a round frame F. The round frame F is a plate of a double-sheet parallel structure. The space in the middle of the double-sheet parallel structure of the plate frame F is the movement space of the pulley and the dragline. And the additional pulley P is to enable smooth sliding of the dragline T in the turning point.

Figure 8:
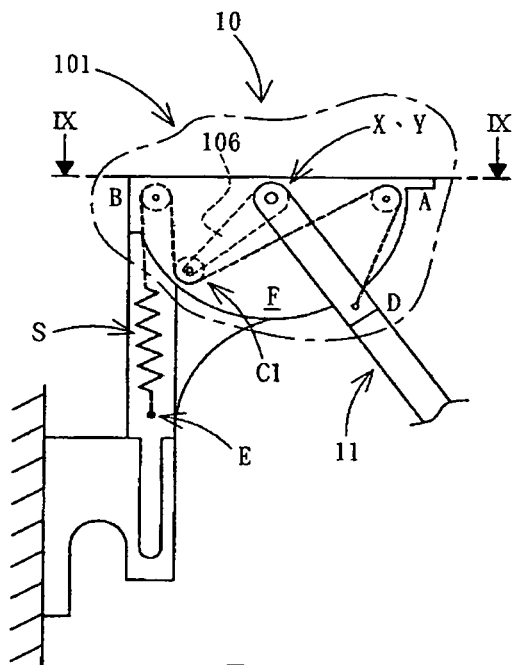
FIG. 8: an illustration of another example of application of the counterweight arm mechanism of the present invention.

FIG. 8 is an illustration of another example of application of the counterweight arm mechanism of the present invention. It reverses the dragline adjusting mechanism of the counterweight arm mechanism shown in FIG. 7 to the same side as the counterweight arm 11. Similar to the example of application in FIG. 7, it uses a frame F, being a plate of a double-sheet parallel structure. The example of application in FIG. 8 also uses plate frame F of a double-sheet parallel structure to replace the dragline torque support 102 and the dragline adjusting mechanism fixed arm 104. In the example of application in FIG. 8, the relative positions of the dragline adjusting mechanism movable arm 106 and the counterweight arm 11 are: when the counterweight arm 11 stays at the horizontal position, the dragline adjusting mechanism movable arm 106 is perpendicular to the hypotenuse of the right angle triangle mechanism of the dragline adjusting mechanism 101, and the right angle triangle mechanism of the dragline adjusting mechanism 101 forms an isosceles right angle triangle. But in this example of application, when the counterweight arm 11 stays at the horizontal position, the angle between the dragline adjusting mechanism movable arm 106 and the counterweight arm 11 is $-\pi/2$.

In the above example of application in FIG. 8, the counterweight arm 11 can at most be lifted to the horizontal height, hence, it is suitable for high-position wall-mounted lamps.

Figure 9:
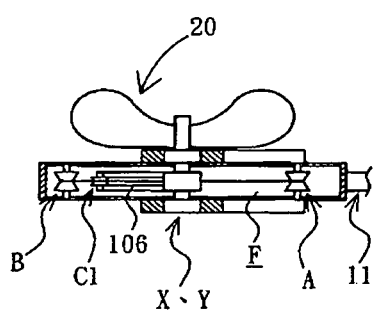
FIG. 9: a partial sectional view of IX-Ix in the example of application of the counterweight arm mechanism shown in FIG. 8.
Figure 10:
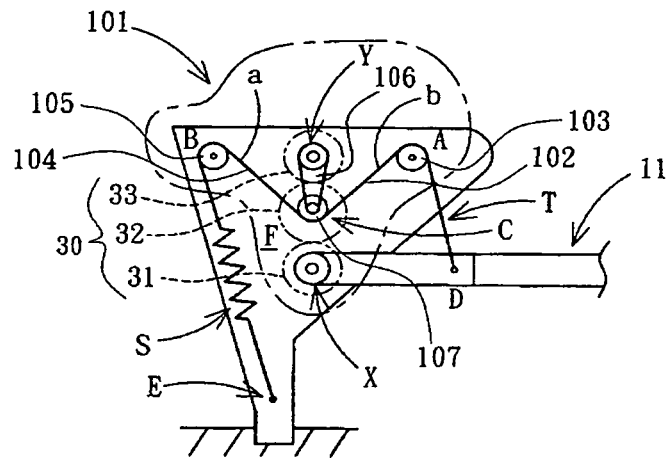
FIG. 10: an illustration a further example of application of the counterweight arm mechanism of the present invention.

FIG. 9 is a partial sectional view of IX-IX in the example of application of the counterweight arm mechanism shown in FIG. 8. It reflects the feasibility of the plate frame F of a double-sheet parallel structure, and meanwhile depicts a facility to adjust the frictional force of the rotating shaft X of the counterweight arm. The facility to adjust the frictional force of the rotating shaft X of the counterweight arm is a locking device 20. By turning the locking device 20, the frictional force of the rotating shaft X of the counterweight arm can be adjusted. FIG. 10 is an illustration of a further example of application of the counterweight arm mechanism of the present invention, with difference in that: the drive mechanism configured between the counterweight arm 11 and the adjustable dragline tension system 100 is a gear set 30. Said gear set 30 at least comprises a first gear 31 sharing the same axis as the rotating shaft X of the counterweight arm, a second gear 32 that meshes with the first gear 31, and a third gear 33 that meshes with the second gear 32; Said first gear 31 and the rotating shaft X of the counterweight arm share the same shaft and are fixed to each other. Said first gear 31 can rotate simultaneously with the counterweight arm 11. When the first gear 31 rotates with the counterweight arm 11, it drives the second gear 32. The second gear 32 is an intermediate gear, which can drive the third gear 33; the third gear 33 and the first gear 31 are gears of equal-addendum teeth; The shaft of the third gear 33 is the rotating shaft Y of the dragline adjusting mechanism movable arm. The dragline adjusting mechanism movable arm 106 is fixed on the shaft of the third gear 33. When the counterweight arm 11 rotates, the third gear 33 will rotate with the counterweight arm 11 for an equal angle, and the dragline adjusting mechanism movable arm 106 will also rotate with the counterweight arm 11 for an equal angle. When the counterweight arm 11 stays at the horizontal position, the dragline adjusting mechanism movable arm 106 installed on the shaft of the third gear 33 is directed to the rotating shaft X of the counterweight arm, and with the shaft of the third gear 33 as the center of symmetry, at a position on the straight line perpendicular to the dragline adjusting mechanism movable arm 106, the dragline torque support 102 and dragline adjusting mechanism fixed arm 104 are symmetrically configured. The dragline torque support terminal position A is installed with a dragline torque support pulley 103.

The dragline adjusting mechanism fixed arm terminal position B is installed with a dragline adjusting mechanism fixed arm pulley 105. The distances from the shaft of the third gear 33 to the dragline torque support terminal position A and to the dragline adjusting mechanism fixed arm terminal position B are equal to the length of the dragline adjusting mechanism movable arm 106, and are all equal to the radium of the circumscribed circle of the right angle triangle mechanism of the dragline adjusting mechanism 101. The support terminal position of the dragline adjusting mechanism movable arm 106 is installed with the dragline adjusting mechanism movable arm pulley 107;

When the counterweight arm 11 rotates, the third gear 33 rotates with the counterweight arm 11 for an equal angle, and the dragline adjusting mechanism movable arm 106 also rotates with the counterweight arm 11 for an equal angle.

In FIG. 10, the dragline torque support 102 and the dragline adjusting mechanism fixed arm 104 are combined with the frame F. Said gear set 30 is configured on the back side of the frame F. The pulleys share the same rotation plane as the counterweight arm 11, which is configured on the other side of the gear set 30, i.e., the front side of the frame F in FIG. 10.

When the counterweight arm mechanism of the present invention is applied in a counterweight arm lamp, the main function of the base 13 is to maintain the posture of the counterweight arm mechanism main frame 12, making sure that, when the counterweight arm 11 stays at the horizontal position, the right angle triangle mechanism of the dragline adjusting mechanism 101 forms an isosceles right angle triangle, so that the extension spring S is under the maximum tension state.

In actual applications, through appropriate mechanical structures, the present invention can be implemented as a wall-mounted lamp, a floor lamp, or a ceiling lamp etc.

Figures 11, 12:
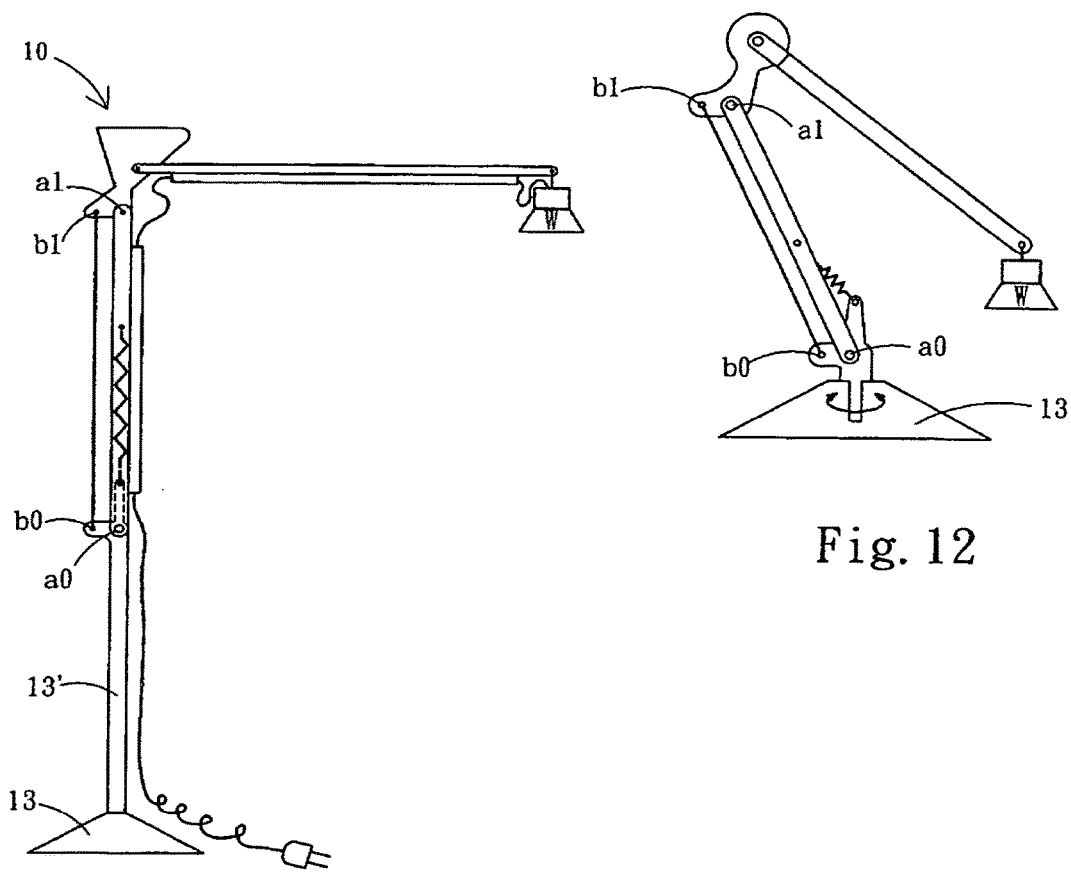
FIG. 11: an illustration of an example of application of the counterweight arm mechanism of the present invention in a counterweight arm lamp.
FIG. 12: an illustration of another example of application of the counterweight arm mechanism of the present invention in a counterweight arm lamp.

FIG. 11 is an illustration of an actual example of application of the counterweight arm mechanism of the present invention in a counterweight arm lamp, adopting the counterweight arm mechanism of the present invention shown in FIG. 10; FIG. 12 is an illustration of another actual example of application of the counterweight arm mechanism of the present invention in a counterweight arm lamp, adopting the counterweight arm mechanism of the present invention shown in FIG. 7.

In the two examples of application shown in FIG. 11 and FIG. 12, the load W on the counterweight arm 11 is a lighting device.

In the example of application disclosed in FIG. 11, between the counterweight arm mechanism main frame 12 and the base 13, a parallel-plane four-bar device is provided. The parallel-plane four-bar device disclosed in the drawing is indicated by sign a0, b0, a1, and b1, where, the driving lever is indicated by sign a0$a$1, the passive lever is indicated by sign b0$b$1, the base bar is indicated by sign a0$b$0, and the connecting bar is indicated by sign a1$b$1.

The base bar a0$b$0 of said parallel-plane four-bar device is fixed on the base 13, the movement plane of the parallel-plane four-bar device is the same as that of the counterweight arm 11. The counterweight arm mechanism main frame 12 of the counterweight arm mechanism 10 is fixed on the connecting bar a1$b$1 that is parallel to the base bar a0$b$0 of the parallel-plane four-bar device. The base bar a0$b$0 of the parallel-plane four-bar device is fixed on the base 13. It can be simply fixed, or, as shown in FIG. 12, fixed by a shaft to enable horizontal rotation. In FIG. 11, the base 13 has a vertical upright pole 13', which is an extension of the base 13.

When the counterweight arm 11 is at the horizontal position, the dragline adjusting mechanism movable arm 106 of the counterweight arm mechanism 10 is perpendicular to the hypotenuse of the right angle triangle mechanism of the dragline adjusting mechanism 101, and the right angle triangle mechanism of the dragline adjusting mechanism 101 forms an isosceles right angle triangle.

The parallel-plane four-bar device is a common mechanism in counterweight arm lamps. Its driving lever a0$a$1 can tilt forward or backward, but the connecting bar a1$b$1 parallel to the base bar a0$b$0 will maintain the same posture. When a combination of the parallel-plane four-bar device and the counterweight arm mechanism of the present invention are applied in a counterweight arm lamp, the parallel-plane four-bar device has a function to extend the base 13, enabling the counterweight arm mechanism of the present invention to maintain a fixed posture.

FIG. 11 also depicts a possible installation of the power cord, but the installation of the power cord is not critical in this patent and there may be many feasible implementations, therefore it is not detailed here.

Figure 13:
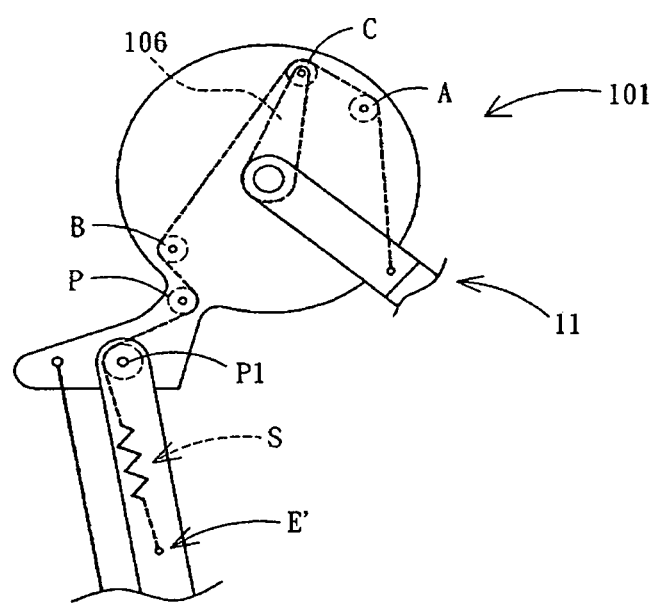
FIG. 13: an illustration of an example of application when the extension spring of the counterweight arm mechanism in FIG. 12 is moved to the driving lever of the parallel-plane four-bar device.

FIG. 13 is an illustration of an example of application when the extension spring S of the counterweight arm mechanism in FIG. 12 is moved to the driving lever a0$a$1 of the parallel-plane four-bar device. The driving lever a0$a$1 of the parallel-plane four-bar device in FIG. 13 is a tube-shaped pole. When the extension spring S is moved into the tube-shaped driving lever a0$a$1 of the parallel-plane four-bar device, one end of the extension spring S is fixed at position E' of the driving lever, the other end of the extension spring S is connected to the dragline. The dragline goes around a deflection pulley P1, and then connected to the dragline adjusting mechanism 101 shown in FIG. 7.

A change of the position of the extension spring S in FIG. 13 will not affect the function of the dragline tension system. Hence, it is an extension of the counterweight arm mechanism of the present invention.

The counterweight arm mechanism of the present invention is a passive mechanism, but when the counterweight arm mechanism of the present invention operates in combination with an active counterweight arm mechanism, particularly in applications which require large-angle downward folding of the counterweight arm, it will provide an obvious benefit to reduce output power and enhance efficiency of the active device.

I claim:

1. A counterweight arm mechanism, comprising:
    a counterweight arm, a counterweight arm rotating shaft, a counterweight arm mechanism main frame, a base, and an adjustable dragline tension system;
    said counterweight arm rotating shaft defined as a horizontal rotating shaft that is perpendicular to the rotation plane of the counterweight arm, configured on the counterweight arm mechanism main frame;
    said counterweight arm constituted by combining the counterweight arm rotating shaft and the counterweight arm mechanism main frame, said counterweight arm rotating shaft also having a facility to adjust the frictional force, and said the counterweight arm mechanism main frame fixed on the base;
    said adjustable dragline tension system including a dragline, an extension spring, and a dragline adjusting mechanism;
    a drive mechanism configured between the adjustable dragline tension system and the counterweight arm;
    said dragline adjusting mechanism comprising a dragline torque support, a dragline torque support pulley, a dragline adjusting mechanism fixed arm, a dragline adjusting mechanism fixed arm pulley, a dragline adjusting mechanism movable arm, a dragline adjusting mechanism movable arm pulley, and a dragline adjusting mechanism movable arm shaft;

said dragline adjusting mechanism movable arm shaft defined as a horizontal rotating shaft parallel to the counterweight arm rotating shaft, and said dragline adjusting mechanism movable arm fixed on the dragline adjusting mechanism movable arm shaft;

said dragline torque support, dragline adjusting mechanism fixed arm, and dragline adjusting mechanism movable arm having equal length, and being radially configured with the dragline adjusting mechanism movable arm shaft as the axis, and terminal positions of the dragline torque support, dragline adjusting mechanism fixed arm, and dragline adjusting mechanism movable arm respectively provided with a dragline torque support pulley, a dragline adjusting mechanism fixed arm pulley, and a dragline adjusting mechanism movable arm pulley, wherein the dragline torque support and the dragline adjusting mechanism fixed arm are fixed on the structure of the counterweight arm mechanism main frame, forming a symmetric linear structure with the dragline adjusting mechanism movable arm shaft as the center;

the adjusting mechanism located at the central position of the adjustable dragline tension system, with two ends thereof being the extension spring and the dragline; the dragline turning around the dragline adjusting mechanism fixed arm pulley, the dragline adjusting mechanism movable arm pulley, and the dragline torque support pulley in the dragline adjusting mechanism by sequence;

one end of the adjustable dragline tension system connected to the rotary counterweight arm, the other end of the adjustable dragline tension system fixed on the structure of the counterweight arm mechanism main frame, and the extension spring of the adjustable dragline tension system configured on either end of the adjustable dragline tension system;

the total length of the dragline and extension spring of the adjustable dragline tension system being adjustable; the dragline adjusting mechanism defined as the adjusting mechanism for the total length of the dragline and extension spring of the adjustable dragline tension system; the tension of the adjustable dragline tension system varied with the adjustment of the total length of the dragline and extension spring by the dragline adjusting mechanism;

wherein said dragline adjusting mechanism is a right angle triangle mechanism, and the catheti of the right angle triangle mechanism are made up of part of the dragline, respectively being the dragline between the dragline adjusting mechanism fixed arm pulley and the dragline adjusting mechanism movable arm pulley and the dragline between the dragline torque support pulley and the dragline adjusting mechanism movable arm pulley; said dragline adjusting mechanism movable arm shaft is the center of the circumscribed circle of the right angle triangle mechanism of the dragline adjusting mechanism; the hypotenuse of the right angle triangle mechanism of the dragline adjusting mechanism is the diameter of the circumscribed circle; the hypotenuse is made up of the dragline torque support and the dragline adjusting mechanism fixed arm; the dragline torque support and the dragline adjusting mechanism fixed arm are in a symmetric linear arrangement with the center of the circumscribed circle of the right angle triangle mechanism as the symmetric center;

wherein said dragline adjusting mechanism movable arm is fixed on the dragline adjusting mechanism movable arm shaft; the relative positions of the dragline adjusting mechanism movable arm and the counterweight arm are: when the counterweight arm stays at the horizontal position, the dragline adjusting mechanism movable arm is perpendicular to the hypotenuse of the right angle triangle mechanism of the dragline adjusting mechanism, when the counterweight arm stays at the horizontal position, the dragline adjusting mechanism movable arm is perpendicular to the linear structure integrating the dragline torque support and the dragline adjusting mechanism fixed arm, so that the right angle triangle mechanism of the dragline adjusting mechanism forms an isosceles right angle triangle;

wherein said dragline adjusting mechanism movable arm pulley is located at the right angle vertex of the right angle triangle mechanism; the dragline adjusting mechanism movable arm can rotate with the counterweight arm for an equal angle; when the dragline adjusting mechanism movable arm rotates, the dragline adjusting mechanism movable arm pulley moves on part of the circular arc of the circumscribed circle of the right angle triangle mechanism.

2. The arm mechanism defined in claim 1, wherein the drive mechanism configured between the counterweight arm and the adjustable dragline tension system is the dragline adjusting mechanism movable arm shaft and the counterweight arm rotating shaft sharing the same shaft and fixed to each other; the dragline adjusting mechanism movable arm is fixed on the dragline adjusting mechanism movable arm shaft; when the counterweight arm rotates, the dragline adjusting mechanism movable arm fixed on the dragline adjusting mechanism movable arm shaft will rotate simultaneously with the counterweight arm.

3. The arm mechanism defined in claim 1, characterized in that: the driving mechanism configured between the counterweight arm and the adjustable dragline tension system is a gear set mechanism; said gear set mechanism at least comprises a first gear sharing the same axis as the counterweight arm rotating shaft, a second gear that meshes with the first gear, and a third gear that meshes with the second gear;

the first gear and the counterweight arm rotating shaft share the same shaft and are fixed to each other; the first gear can rotate simultaneously with the counterweight arm; when the first gear rotates along with the counterweight arm, it drives the second gear; the second gear is an intermediate gear, and can drive the third gear; the third gear and the first gear are gears of equal-addendum teeth;

the shaft of the third gear is the dragline adjusting mechanism movable arm shaft; the dragline adjusting mechanism movable arm is fixed on the shaft of the third gear;

when the counterweight arm rotates, the third gear rotates with the counterweight arm for an equal angle, and the dragline adjusting mechanism movable arm also rotates with the counterweight arm for an equal angle;

when the counterweight arm stays at the horizontal position, the dragline adjusting mechanism movable arm installed on the shaft of the third gear is directed to the counterweight arm rotating shaft, and with the shaft of the third gear as symmetric center, at a position on the straight line perpendicular to the dragline adjusting mechanism movable arm, the dragline torque support and dragline adjusting mechanism fixed arm are symmetrically configured;

the dragline torque support terminal position is installed with a dragline torque support pulley, and the dragline adjusting mechanism fixed arm terminal position is installed with a dragline adjusting mechanism fixed arm pulley;

the distances from the shaft of the third gear to the dragline torque support terminal position and to the dragline adjusting mechanism fixed arm terminal position are equal to the length of the dragline adjusting mechanism movable arm, and are all equal to the radium of the circumscribed circle of the right angle triangle mechanism of the dragline adjusting mechanism; the dragline adjusting mechanism movable arm terminal position is installed with a dragline adjusting mechanism movable arm pulley;

when the counterweight arm rotates, the third gear rotates with the counterweight arm for an equal angle, and the dragline adjusting mechanism movable arm also rotates with the counterweight arm for an equal angle.

4. The arm mechanism defined in claim 1, wherein the dragline adjusting mechanism is a right angle triangle mechanism; the catheti of the right angle triangle mechanism are made up of parts of the dragline of the adjustable dragline tension system; the dragline length adjusting mechanism is implemented according to the feature of the sum of catheti of the right angle triangle $\triangle ABC$, i.e., $a+b=2\sqrt{2}\ R\cdot\sin(A+\pi/4)$; in the above formula of sine function, a and b are the sides opposite $\angle A$ and $\angle B$ of the right angle triangle $\triangle ABC$, $\angle C$ is a right angle, R is the radium of the circumscribed circle of the right angle triangle $\triangle ABC$, and a and b are catheti of the right angle triangle $\triangle ABC$; according to the formula of sine function feature of the sum of catheti of a right angle triangle, when the counterweight arm stays at the horizontal position, sum of catheti is set as the maximum value, i.e., $\angle A$ is equal to $\pi/4$, the right angle triangle mechanism is an isosceles right angle triangle; when the counterweight arm rotates to depart from the horizontal position, the right angle vertex C of the right angle triangle $\triangle ABC$ rotates with the counterweight arm on the arc of the circumscribed circle of the right angle triangle $\triangle ABC$, and the length of the sum of catheti varies according to the above formula of sine function feature of the sum of catheti of the right angle triangle.

5. The mechanism defined in claim 1, wherein one end of the counterweight arm beyond the counterweight arm rotating shaft is provided with a load; said load is a lighting device.

6. The mechanism defined in claim 1, wherein one end of the counterweight arm beyond the counterweight arm rotating shaft is provided with a load; said load is a lighting device;

between the counterweight arm mechanism and the base, there is a further configuration of a parallel-plane four-bar device;

the base bar of the parallel-plane four-bar device is fixed on the base, and the plane of the parallel-plane four-bar device is the same as the movement plane of the counterweight arm; the counterweight arm mechanism main frame of the counterweight arm mechanism is fixed on the connecting bar of the parallel-plane four-bar device; the connecting bar is parallel to the base bar; when the counterweight arm stays at the horizontal position, the dragline adjusting mechanism movable arm of the counterweight arm mechanism is perpendicular to the hypotenuse of the right angle triangle mechanism of the dragline adjusting mechanism, and the right angle triangle mechanism of the dragline adjusting mechanism forms an isosceles right angle triangle.

7. The arm mechanism defined in claim 1, wherein one end of the adjustable dragline tension system is connected to the rotary counterweight arm, and the other end of the adjustable dragline tension system is connected to the stationary the counterweight arm mechanism main frame; the extension spring of the adjustable dragline tension system is configured on the counterweight arm.

\* \* \* \* \*